United States Patent [19]

Hart

[11] Patent Number: 5,144,486
[45] Date of Patent: Sep. 1, 1992

[54] LASER BEAM APPARATUS FOR PROVIDING MULTIPLE REFERENCE BEAMS

[75] Inventor: Edward E. Hart, Springfield, Ohio

[73] Assignee: Spectra-Physics Laserplane, Inc., Dayton, Ohio

[21] Appl. No.: 590,677

[22] Filed: Oct. 1, 1990

[51] Int. Cl.[5] ............... G02B 27/14; G01B 11/26
[52] U.S. Cl. .................. 359/629; 359/637; 356/138
[58] Field of Search ............ 350/173, 171; 356/153, 356/138

[56] References Cited

U.S. PATENT DOCUMENTS

| | | |
|---|---|---|
| 3,588,255 | 6/1971 | Alexander . |
| 3,796,496 | 3/1974 | Appler et al. . |
| 3,817,624 | 6/1974 | Martin ................. 350/173 |
| 3,966,328 | 6/1976 | Wiklund . |
| 4,031,629 | 6/1977 | Paluck . |
| 4,035,084 | 7/1977 | Ramsay . |
| 4,062,634 | 12/1977 | Rando et al. . |
| 4,676,598 | 6/1987 | Markley et al. . |
| 4,676,634 | 6/1987 | Peterson . |
| 4,767,208 | 8/1988 | Cain et al. . |
| 4,770,480 | 9/1988 | Teach . |
| 4,852,265 | 8/1989 | Rando et al. ............ 356/138 |

Primary Examiner—Jon W. Henry
Attorney, Agent, or Firm—Killworth, Gottman, Hagan & Schaeff

[57] ABSTRACT

A laser beam projector apparatus is provided and includes a laser tube for producing a primary light beam in an initial path. A first beam diverter is included for diverting a first portion of the primary beam into a first direction to emerge from the apparatus as a first reference beam and for diverting a second portion of the primary beam into a second direction substantially parallel but opposite to the first direction. The apparatus further includes a second beam diverter for intercepting the second portion of the primary beam and allowing a first part of the second portion to pass therethrough and emerge from the apparatus in the second direction as a second stationary reference beam. The second beam diverter further serves to divert a second part of the second portion substantially 90 degrees into a third direction. A rotation mechanism is included for rotating the second beam diverter about an axis which is substantially parallel to the first and second directions so that the second part is directed outwardly from and rotated about the axis to produce a moving reference beam defining a reference plane which is substantially perpendicular to the stationary reference beams.

10 Claims, 3 Drawing Sheets

U.S. Patent    Sep. 1, 1992    Sheet 1 of 3    5,144,486
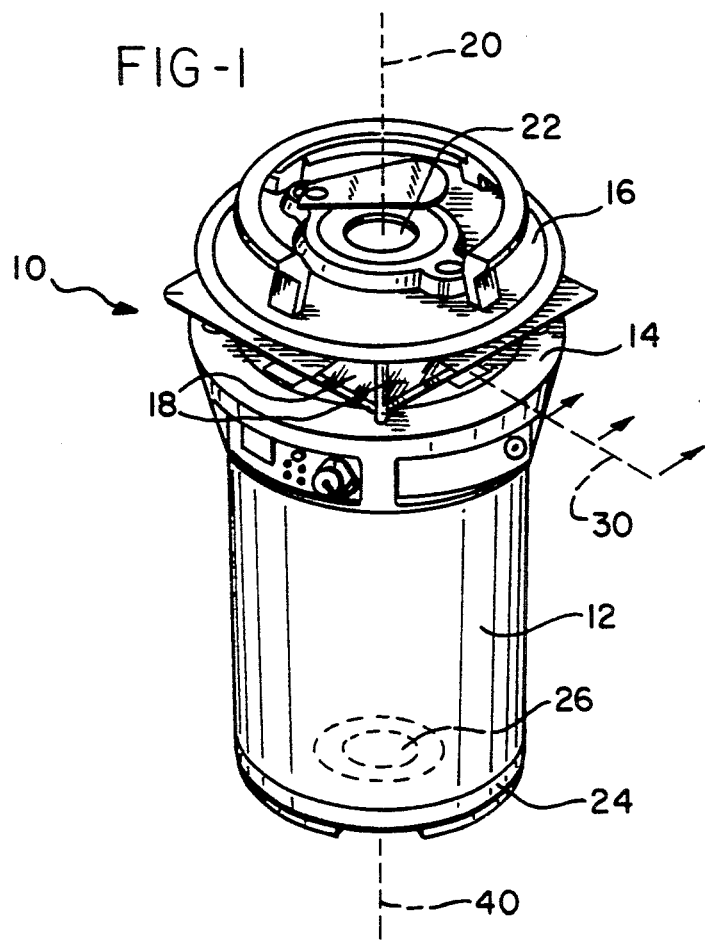
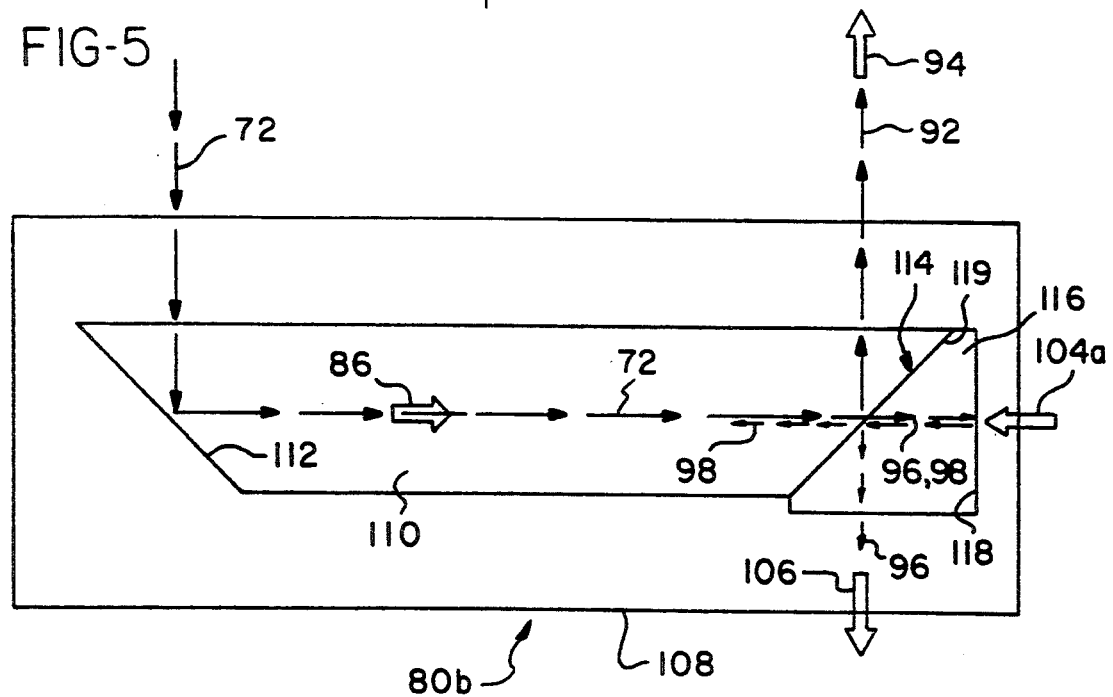

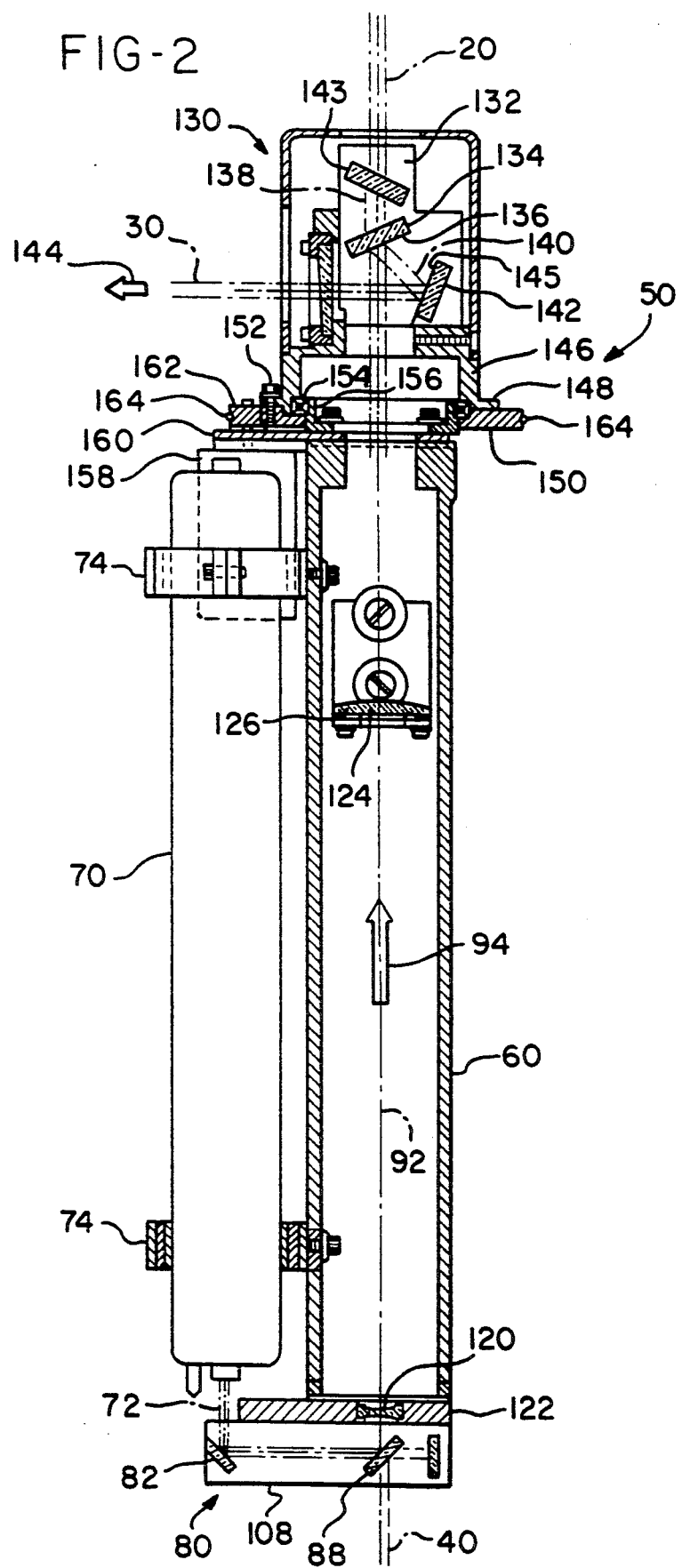

LASER BEAM APPARATUS FOR PROVIDING MULTIPLE REFERENCE BEAMS

BACKGROUND OF THE INVENTION

The present invention relates generally to apparatus for providing reference light beams and, more particularly, to apparatus wherein three such beams simultaneously define two reference lines and an orthogonal reference plane.

Laser beam systems have been employed in numerous surveying and construction applications. In one such system, a laser beam projector device provides a rotating laser beam which establishes a reference plane. In use, the projector may, for example, be mounted at the desired height of a hanging ceiling in a building under construction. The beam is rotated in a horizontal plane to assist the workers in determining the proper height for the ceiling throughout the room.

The rotating laser beam provides a continuous, visible plane of light that creates a constant horizontal benchmark of elevation over the entire work area. Additionally, it allows the workers to check for low duct work, sprinklers, and other obstructions before setting the support grid for the ceiling. Such a horizontal reference plane is also advantageous in constructing raised access flooring. Typically, the laser projector device also can be positioned to provide a vertical reference plane of light, or a plane of light in other orientations. A laser projector device of this type can be used for laying out overhead drop walls and bulkheads, and in other construction operations.

U.S. Pat. Nos. 4,062,634; 4,035,085; and, 4,031,629 all disclose rotating laser beam projector devices. In each projector device, a generally horizontal rotating laser beam is produced by projecting a primary laser beam generally upward and then deflecting the beam by 90 degrees within a penta-mirror or pentaprism assembly. The pentaprism assembly is rotated about a vertical axis to cause the horizontal beam to rotate. In the past, some laser projector devices have included a removable pentaprism assembly. With such a projector device, the plane defined by the rotating beam could be aligned with a building structure, for example a wall, and the pentaprism assembly could thereafter be removed to produce a reference line normal to the wall.

U.S. Pat. No. 4,676,598 discloses a laser beam projector device which produces an upwardly extending, stationary reference beam and a rotating reference beam perpendicular thereto. With this laser projector device, pentaprism assembly removal is not necessary since the projector device produces an upwardly extending, stationary reference beam.

It has been found, however, that it is sometimes necessary to reference the upwardly extending, stationary reference beam and/or the rotating reference beam with a reference point located below the laser projector device on, for example, the floor of a structure under construction. A plumb bob hanging from a laser projector device has sometimes been used to provide a means for aligning the upwardly extending, stationary reference beam and/or the rotating reference beam with such a reference point. Hanging a plumb bob from a projector device, however, is not convenient and there is a risk that the plumb bob may be improperly positioned below the projector device, resulting in inaccuracies.

It is seen, therefore, that there is a need for a an improved laser beam projector device wherein an upwardly extending, stationary reference beam and/or a rotating reference beam may be accurately positioned with respect to a reference point located below the laser projector device.

SUMMARY OF THE INVENTION

This need is met by the light beam projector of the present invention wherein a single light beam is converted into an upwardly extending, stationary reference light beam, a downwardly extending, stationary reference light beam and a reference light plane. With this projector, the upwardly extending beam and/or the reference plane can be conveniently aligned relative to a reference point located beneath the projector without the use of a plumb bob. A light source generates the single light beam which is initially directed or diverted to be directed in a preferably substantially horizontal direction. A first portion of the light beam is diverted downwardly to define the downwardly extending reference light beam. A substantial portion of the remainder of the light beam is diverted upwardly. The upwardly diverted portion of the light beam can be used directly as an upwardly extending reference light beam or can be directed to a reference plane generator which can generate a reference light plane or both a reference light plane and an upwardly extending reference light beam.

In accordance with one aspect of the present invention, an improved apparatus for projecting a light beam to provide a plurality of reference beams is provided and includes means for providing a primary light beam in an initial path. The apparatus includes first beam diverting means for intercepting the primary beam and diverting a first portion thereof into a first direction to emerge from the apparatus in the first direction as a stationary reference beam and a second portion thereof into a second direction substantially parallel to the first direction. Second beam diverting means are included for intercepting and diverting the second portion of the primary beam to define a reference plane which is substantially perpendicular to the stationary reference beam. The second beam diverting means diverts the second portion of the primary beam into a third direction, which is substantially perpendicular to the first and second directions. Rotation means are provided and serve to rotate the second beam diverting means about an axis which is substantially parallel to the first and second directions to generate the reference plane.

The second beam diverting means may comprise a first beam deflecting element having a first reflection surface oriented at an angle with respect to the second direction for reflecting the second portion of the primary beam. A second beam deflecting element is provided and includes a second reflection surface oriented at an angle of approximately 45 degrees with respect to the first reflection surface for further reflecting the second portion of the primary beam which is reflected by the first beam deflecting element into the third direction. The first and second reflection surfaces are fully reflective.

The first direction, the second direction and the axis may be substantially collinear with one another. Alternatively, the first and second directions may be offset from one another, with the axis substantially collinear with the second direction.

The first beam diverting means may comprise a first prism having a first surface which is fully reflective for intercepting and diverting the primary beam from the initial path substantially 90 degrees into a fourth direction toward a second surface of the first prism. The second surface of the first prism is partially reflective and partially transmissive for diverting the second portion of the primary beam from the fourth direction substantially 90 degrees into the second direction and allowing the first portion and a third portion of the primary beam to exit from the first prism therethrough in the fourth direction. A second prism having a fully reflective surface is provided for reflecting the first portion and the third portion of the primary beam into a fifth direction back toward the second surface of the first prism. The fifth direction is parallel and opposite to the fourth direction. The second surface of the first prism further serves to divert the first portion of the primary beam reflected by the reflective surface of the second prism from the fifth direction substantially 90 degrees into the first direction to emerge from the apparatus as the stationary reference beam while allowing the third portion of the primary beam to pass unused therethrough.

The first beam diverting means may alternatively comprise a first reflecting element having a surface which is fully reflective for intercepting and diverting the primary beam from the initial path substantially 90 degrees into a fourth direction. A second reflecting element is included having first and second surfaces one of which is a reflective surface. The reflective surface is partially reflective and partially transmissive for diverting the second portion of the primary beam from the fourth direction substantially 90 degrees into the second direction and allowing the first portion and a third portion of the primary beam to exit from the second reflecting element in a fifth direction substantially parallel to the fourth direction. The first beam diverting means also includes a third reflecting element having a fully reflective surface for reflecting the first portion and the third portion of the primary beam into a sixth direction back toward the reflective surface of the second reflecting element. The sixth direction is substantially parallel and opposite to the fourth and fifth directions. The reflective surface of the second reflecting element further serves to divert the first portion reflected by the reflective surface of the third reflecting element from the sixth direction substantially 90 degrees into the first direction to emerge from the apparatus as the stationary reference beam while allowing the third portion to pass therethrough.

The first surface of the second reflecting element may be the reflective surface thereof and the second portion of the primary beam is reflected in the second direction by the first surface of the second reflecting element without passing through the second surface of the second reflecting element. Alternatively, the second surface of the second reflecting element may be the reflective surface thereof and the second portion of the primary beam is reflected in the second direction by the second surface of the second reflecting element after first traveling through the first surface of the second reflecting element.

In accordance with a further aspect of the present invention an apparatus for projecting a light beam to provide a plurality of reference beams is provided and comprises means for providing a primary light beam in an initial path. The apparatus includes first beam diverting means for intercepting the primary beam and diverting a first portion thereof into a first direction to emerge from the apparatus in the first direction as a first stationary reference beam and a second portion of the primary beam into a second direction substantially parallel to the first direction. Second beam diverting means are included for intercepting the second portion of the primary beam and permitting a first part of the second portion to pass therethrough and emerge from the apparatus as a second stationary reference beam and for diverting a second part of the second portion of the primary beam to define a reference plane which is substantially perpendicular to the first and second stationary reference beams. The second beam diverting means diverts the second part of the second portion of the primary beam into a third direction which is substantially perpendicular to the first and second directions. Rotation means are included for rotating the second beam diverting means about an axis which is substantially parallel to the first and second directions to generate the reference beam.

The second beam diverting means may comprise a first mirror having a first reflection surface which is partially reflective and partially transmissive. The first mirror is positioned in the path of the second portion of the primary beam traveling in the second direction at an angle to reflect the second part of the second portion while permitting the first part of the second portion to pass therethrough as the second reference beam. A second mirror is included having a second reflection surface which is fully reflective. The second mirror is positioned in the path of the second part of the second portion of the primary beam reflected by the first mirror and is oriented with the reflection surface thereof at an angle of substantially 45 degrees with respect to the reflection surface of the first mirror for further reflecting the second part of the second portion of the primary beam into the third direction. The second beam diverting means preferably further comprises a correcting element which is substantially transmissive and which is positioned in the path of the second stationary reference beam to compensate for error in the second stationary reference beam position produced by the first mirror.

The first direction, the second direction and the axis may be substantially collinear with one another. Alternatively, the first and second directions may be offset from one another, with the axis substantially collinear with the second direction.

The first beam diverting means may comprise a first prism and a second prism as described above with regard to the first aspect of the present invention. Alternatively, the first beam diverting means may comprise first, second and third reflecting elements as also described above with regard to the first aspect of the present invention.

Accordingly, it is an object of the present invention to provide a laser beam projector apparatus wherein an upwardly extending, stationary reference beam and/or a rotating reference beam may be accurately positioned with respect to a reference point located below the laser projector apparatus by a downwardly extending, stationary reference beam emitted therefrom. This and other objects and advantages of the invention will be apparent from the following description, the accompanying drawings and the appended claims.

BRIEF DESCRIPTION OF THE DRAWINGS

FIG. 1 is a perspective view of a laser beam projector apparatus of the present invention;

FIG. 2 is a partially schematicized view, with parts in section, of the laser beam projector means of the laser beam projector apparatus of FIG. 1;

FIG. 5 is an enlarged side view of a second alternative embodiment of the first beam diverting means of the laser beam projector apparatus of the present invention with one of its mounting plates removed.

DETAILED DESCRIPTION OF THE PREFERRED EMBODIMENT

Figure 3:
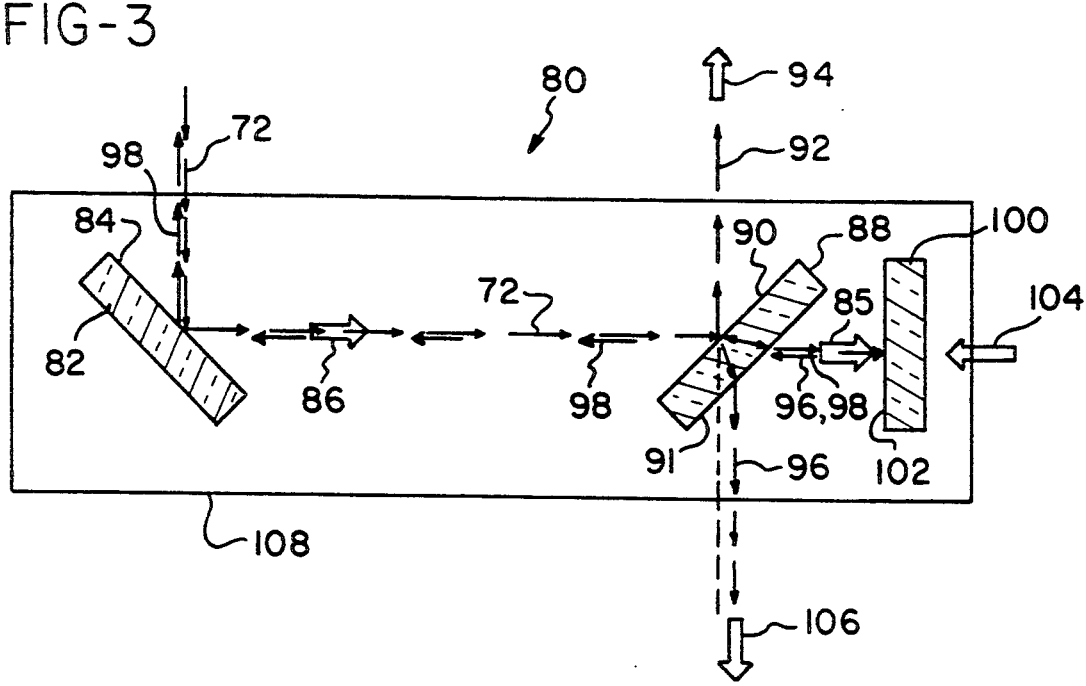
FIG. 3 is an enlarged sectional side view of the first beam diverting means shown in FIG. 2.

Reference is made to FIG. 1 of the drawings which illustrates the laser beam projector 10 of the present invention which projects a plurality of reference beams from a single primary light beam. The laser beam projector 10 is similar in many respects to the device disclosed in Markley et al, U.S. Pat. No. 4,676,598, which is incorporated herein by reference. The present invention and the device taught in Markley et al both produce an upwardly extending, stationary reference beam and a rotating reference beam which defines a plane substantially perpendicular to the stationary reference beam. The present invention, however, also produces a first stationary reference beam 40 in a first direction, i.e., downward, in addition to an upwardly extending, second stationary reference beam 20 and a rotating reference beam 30.

The apparatus 10 includes a housing 12 having attached thereto an upper circular rim 14, a cap plate 16 and a base plate 24. The upwardly extending, stationary reference beam 20 is allowed to exit from the apparatus 10 through an upper optically flat piece of glass 22 located in the cap plate 16. A lower optically flat piece of glass 26, located in the base plate 24, allows the downwardly extending, stationary reference beam 40 to exit from the apparatus 10 therethrough. The apparatus 10 further includes glass panels 18, located between the cap plate 16 and the upper circular rim 14, through which the rotating reference beam 30 is permitted to exit from the apparatus 10.

The apparatus 10 includes a laser beam projector means 50, shown in FIG. 2, which generates the reference beams 20, 30 and 40 from a primary light beam 72. The projector means 50 includes a chassis 60 which is mounted within the housing 12 by a gimbal frame (not shown) in a known manner similar to that disclosed in U.S. Pat. No. 4,062,634, which is incorporated herein by reference. A laser tube 70 is mounted to the chassis 60 by clamps 74 and generates the primary laser beam 72 in an initial path. Also mounted to the chassis 60 are first and second diverting means 80 and 130, respectively, for intercepting and diverting the primary beam 72 into the reference beams 20, 30 and 40. A portion of the beam is diverted into a first direction, which forms the first reference beam 40, and a portion of the beam is diverted into a second direction parallel to the first direction but opposite thereto for forming the reference beam 20 and the reference beam 30 which is rotated in a third direction.

The first diverting means 80, shown in FIGS. 2 and 3, comprises a first reflecting element or mirror 82 having a surface 84 with a coating thereon making it fully reflective. The mirror 82 is positioned so that its surface 84 intercepts and diverts the primary beam 72 from its initial path substantially 90 degrees into a fourth direction, indicated by arrow 86 in FIG. 3.

A second reflecting element or mirror 88 is located a space distance downstream in the fourth direction 86 from the first mirror 82. The second mirror 88 includes first and second surfaces 90 and 91, respectively, with the first surface 90 having a coating thereon making it partially reflective and partially transmissive. The surface 90 serves to intercept the primary beam 72 and divert a second portion 92 thereof substantially 90 degrees into the second direction, indicated by arrow 94, toward the second diverting means 130. The surface 90 also allows the remaining portion of the primary beam 72 comprising a first portion 96 and a third portion 98 to pass therethrough in a fifth direction 85, which is substantially parallel to the fourth direction 86.

Located a spaced distance downstream in the fifth direction 85 from the second mirror 88 is a third reflecting element or mirror 100 having a surface 102 with a coating thereon making the surface 102 fully reflective. The surface 102 serves to reflect the first and third portions 96 and 98, respectively, of the primary beam 72 back toward the second mirror 88 into a sixth direction, indicated by arrow 104.

The surface 90 of the second mirror 88 further serves to deflect the first portion 96 of the primary beam 72 substantially 90 degrees into the first direction, indicated by arrow 106, which is substantially parallel but opposite to the second direction 94. The first portion 96 thereafter emerges from the apparatus 10 through the lower optically flat piece of glass 26 as the downwardly extending, first stationary reference beam 40. The surface 90 also serves to allow the third portion 98 to pass therethrough unused.

It is apparent from FIG. 3 that the first portion 96 is refracted upon entering and leaving the second mirror 88. As a result, the first and second portions 96 and 92, respectively, emerge reflected from the second mirror 88 offset a small distance from one another in the first and second directions 106 and 94, respectively. The amount that the first and second portions 96 and 92 are offset from one another depends upon the index of refraction and the thickness of the glass that is employed. Preferably, the glass employed for mirror 88 should have an index of refraction and a thickness resulting in an offset distance between the first and second portions 96 and 92 small enough that it will not appreciably affect the accuracy of the apparatus 10.

The first and second mirrors 82 and 88, respectively, may be mounted between first and second mounting plates 108, only one of which is shown, by means such as adhesive or the like. The first and second mounting plates 108 are then mounted onto the chassis 60 by suitable means, such as brackets (not shown).

Figure 4:
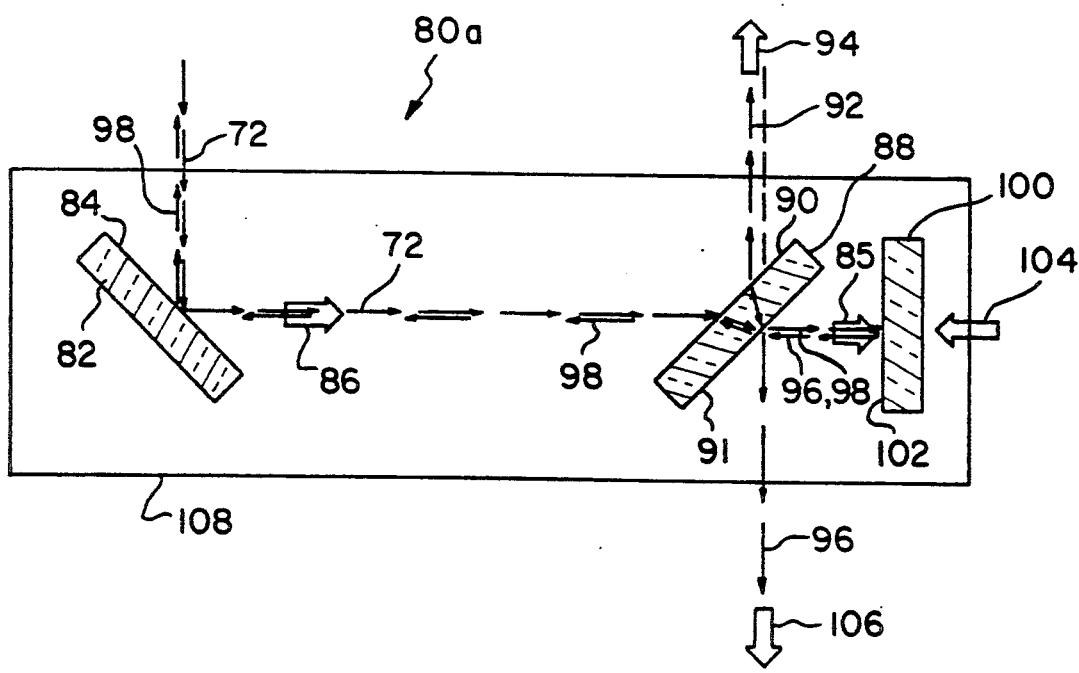
FIG. 4 is an enlarged sectional side view of a first alternative embodiment of the first beam diverting means of the laser beam projector apparatus of the present invention.

A first alternative embodiment of the first diverting means, generally designated 80a, is shown in FIG. 4, where like reference numerals represent like elements. In this embodiment, the second surface 91 of the second mirror 88, rather than the first surface 90, includes thereon the partially reflective coating. As a result, the second surface 91 is partially reflective and partially transmissive while the first surface 90 is substantially transmissive.

In this first alternative embodiment, the first portion 96 of the primary beam 72, after being reflected by the mirror 100, is diverted by the second surface 91 into the first direction 106 without passing back through the first surface 90 of the mirror 88. Further, the second portion 92, in order to be deflected into the second direction 94 by the second surface 91, must pass in and out of the second mirror 88, resulting in the second portion 92 being defracted somewhat by the mirror 88. Consequently, the first and second portions 96 and 92 of the primary beam 72 emerge reflected from the second mirror 88 again somewhat offset a small distance from one another in the first and second directions 106 and 94, respectively.

A second alternative embodiment of the first diverting means, generally designated 80b, is shown in FIG. 5, where like reference numerals represent like elements. This embodiment includes a retro-prism 110 connected between first and second mounting plates 108 (only one of which is shown). The retro-prism 110 includes a first surface 112 having a coating thereon making the surface 112 fully reflective. The surface 112 serves to intercept and divert the primary beam 72 from its initial path substantially 90 degrees into the fourth direction 86. The retro-prism 110 further includes a second surface 114 having a coating thereon making it partially reflective and partially transmissive. The second surface 114 serves to intercept the primary beam 72 and divert a second portion 92 thereof substantially 90 degrees into the second direction 94 toward the second diverting means 130. The second surface 114 also allows the remaining portion of the primary beam 72 comprising a first portion 96 and a third portion 98 to pass therethrough in the fourth direction 86.

Connected to the retro-prism 110, along its edge adjacent to the second surface 114, is a right angle prism 116. The retro-prism 110 and the right angle prism 116 are connected to one another by a suitable adhesive in a known manner. The right angle prism 116 includes a first surface 118 having a coating thereon making the surface 118 fully reflective. The surface 118 serves to reflect the first portion 96 and the third portion 98 of the primary beam 72 back toward the second surface 114 of the retro-prism 110 into a fifth direction 104a which is substantially similar to the sixth direction 104 of the embodiments shown in FIGS. 3 and 4.

The surface 114 of the retro-prism further serves to deflect the first portion 96 of the primary beam 72 substantially 90 degrees into the first direction 106 while allowing the third portion 98 of the primary beam 72 to pass therethrough unused. The first portion 96 thereafter emerges from the apparatus 10 through the lower optically flat piece of glass 26 as the downwardly extending, stationary reference beam 40.

It is also contemplated by this invention that the partially reflective coating on the surface 114 of the retro-prism 110 may, instead, be place on a second surface 119 of the right angle prism 116. Thus, the second surface 119 of the prism 116 will serve to deflect the first portion 96 into the first direction 106 and will likewise serve to reflect the second portion 92 into the second direction 94.

As shown in FIG. 5, when the retro-prism 110 is used in combination with the right angle prism 116, the first and second portions 96 and 92, respectively, emerge from the combination substantially collinear. Thus, this embodiment eliminates the offset distance between the first portion 96 and the second portion 92.

The partially reflective and partially transmissive surface of the mirror 88, the retro-prism 110 or the right angle prism 116 may, for example, have a coating thereon making the surface substantially 80% reflective and 20% transmissive to light at the wavelength of the primary beam when impinging thereupon at an angle of incidence of approximately 45 degrees. Thus, using such a coating on the surface of the mirror 88, the retro-prism 110 or the right angle prism 116, the second portion 92 would comprise about 80% of the primary beam 72, the first portion 96 would comprise about 16% of the primary beam 72 and the third portion 98, which is unused, would comprise about 4% of the primary beam 72. It also contemplated by this invention that other coatings may be used which would make the partially reflective surface either more or less transmissive to a beam impinging thereupon than that of the coating set forth in the example above.

After the second portion 92 emerges from the first diverting means 80, it preferably passes through a diverging lens 120 for diverging the same to a desired diameter. The lens 120 is mounted within a plate 122 connected to the chassis 60 by suitable means. After passing through lens 120, the second portion 92 passes through a converging lens 124 for collimating the second portion 92 in the second direction 94. The converging lens 124 is mounted by a bracket 126 secured by suitable means on the inside of the chassis 60.

From the converging lens 124, the second portion 92 of the primary beam 72 enters into the second diverting means 130. The preferred second diverting means 130, shown in FIG. 2, is substantially similar to that disclosed in U.S. Pat. No. 4,676,590 and includes a number of beam deflecting elements extending between a pair of side plates 132 (only one of which is shown in FIG. 2). A first beam deflecting mirror or element 134 having a first reflection surface 136 which is partially reflective and partially transmissive is positioned in the path of the second portion 92 at an oblique angle thereto. The first element 134 serves to intercept the second portion 92 and allow a first part 138 of the second portion 92 to pass therethrough as the second reference beam 20. The first element 134 further serves to reflect a second part 140 of the second portion 92 toward a second beam deflecting mirror or element 142 which includes a second reflection surface 145. The second reflection surface 145 is oriented at an angle of approximately 45 degrees with respect to the first reflection surface 136 such that it further reflects the second part 140 directed to it by the mirror 134 into the third direction 144 which is substantially perpendicular to the first and second directions 106 and 94. Thus, the second part 140 is permitted to emerge from the apparatus 10 in the third direction 144 through the glass panels 18 as the reference beam 30.

Since the surface 136 of the element 134 is at an oblique angle to the incident second portion 92, the transmissive first part 138 is refracted entering and emerging from the element 134 and is thereby shifted laterally to the left, as seen in FIG. 2, such that it is generally parallel to but out of alignment with the second portion 92. To compensate for this mispositioning, the second beam diverting means 130 further includes a third beam deflecting element 143 which is substantially transmissive. The element 143 is oriented at an angle (here shown 45 degrees) with respect to the surface 136. As may be seen in FIG. 2, element 143, made of glass, effects refraction in a manner opposite to element 134 and produces a lateral shift to the right which returns the second part 138 into alignment with the second portion 92.

The surface 136 on the mirror 134 may have a coating thereon making it 70% reflective and 30% transmissive to light at the wavelength of the primary beam when impinging upon the surface 136 at an angle of incidence of approximately 45 degrees. Thus, using such a coating on the surface 136, the first part 138 would comprise about 30% of the second portion 92 and the second part 140 would comprise about 70% of the second portion 92. It is also contemplated by this invention that other coatings may be used which would make the surface either more or less transmissive to a beam impinging thereon than that of the coating set forth in the example above.

The second diverting means 130 further includes a platform 146 for mounting the side plates 132 thereto by suitable means (not shown). The platform 146 is mounted for rotation about an axis collinear with the second direction 94 and includes a flange 148 which is mounted to a driven pulley 150, such as by bolts 152. The outer race of a ball bearing assembly 154 is concentrically mounted within the platform 146, and the inner race of the bearing 154 is mounted on an annular bearing mount 156 which is secured in a known manner with the chassis 60. A motor 158, mounted to the chassis 60 by a bracket 160, has a drive shaft keyed to a drive pulley 162. A suitable flexible endless belt 164 is place about a groove formed in the pulleys 150 and 162 for rotating the platform 146. Thus, by way of the motor 158, the second part 140 of the second portion 92 may be directed outwardly from and rotated about the axis collinear with the second direction 94 to produce a moving beam 30 for defining a reference plane which is substantially perpendicular to the stationary reference beams 20 and 40.

It is further contemplated by this invention, that a first alternative second diverting means may be employed having a mirror 134 with a reflection surface 136 thereon that is fully reflective, as is known in the art. A second diverting means such as this would not produce an upwardly extending, stationary reference beam but would only create a moving reference beam.

It is also contemplated by this invention, that a second alternative second diverting means may be employed comprising a reflective cone placed in the path of the second portion 92 as it emerges from the converging lens 124. The cone would include a frustoconical reflective outer surface which would serve to reflect the second portion 92 substantially 90 degrees into the third direction 144 as a reference plane.

It is further contemplated that the cone could include an opening extending upwardly therethrough for allowing a first part of the second portion 92 to pass therethrough as an upwardly extending, stationary reference beam while the outer surface of the cone would serve to reflect a second part of the second portion 92 outwardly in the third direction 144 as a reference plane.

By the present invention, a primary laser beam is split into two stationary reference beams and a moving reference beam which defines a reference plane substantially perpendicular to the stationary reference beams. The two stationary reference beams travel in first and second directions which are substantially parallel but opposite to one another. The moving reference beam travels about an axis which is substantially parallel to the first and second directions. The present invention has a number of advantages, such as permitting an upwardly extending, stationary reference beam and/or a rotating reference beam to be accurately positioned directly over a point located beneath the laser projector device on, for example, the floor of a structure under construction. This invention eliminates the difficulties previously encountered with prior art devices of the type including plumb bobs attached thereto, where misalignment might occur during the placement of the plumb bob onto the apparatus.

Having described the invention in detail and by reference to preferred embodiments thereof, it will be apparent that modifications and variations are possible without departing from the scope of the invention defined in the appended claims. For example, it is contemplated by this invention that the first two embodiments of the first diverting means, shown in FIGS. 3 and 4, respectively, may include a further correcting element similar to element 143 used in the second diverting means. Such an element would be placed in the path of the portion of the primary beam refracted by the mirror 88 for causing refraction in an opposite manner, thereby eliminating the offset distance between the first and second portions 96 and 94.

What is claimed is:

1. An apparatus for projecting a light beam to provide a plurality of reference beams, comprising:

means for providing a primary light beam in an initial path;

first beam diverting means or intercepting said primary beam and diverting a first portion thereof into a first direction to emerge from said apparatus in said first direction as a first stationary reference beam and a second portion thereof into a second direction substantially parallel to said first direction;

second beam diverting means for intercepting said second portion of said primary beam and permitting a first part of said second portion to pass therethrough and emerge from said apparatus as a second stationary reference beam and for diverting a second part of said second portion into a third direction which is substantially perpendicular to said first and second directions to define a third reference beam; and wherein said first beam diverting means comprises a first prism having a first surface which is fully reflective for intercepting and diverting said primary beam from said initial path substantially 90 degrees into a fourth direction toward a second surface of said first prism, said second surface of said first prism being partially reflective and partially transmissive for diverting said second portion of said primary beam from said fourth direction substantially 90 degrees into said second direction and allowing said first portion and a third portion of said primary beam to exit from said first prism therethrough in said fourth direction, a second prism having a fully reflective surface for reflecting said first portion and said third portion of said primary beam into a fifth direction back toward said second surface of said first prism, said fifth direction being parallel and opposite to said fourth direction, and said second surface of said first prism further diverting said first portion of said primary beam reflected by said reflective surface of said second prism from said fifth direction substantially 90 degrees into said first direction to emerge from said apparatus as said first stationary reference beam while allowing said third portion of said primary beam to pass therethrough.

2. An apparatus for projecting a light beam as claimed in claim 1, further comprising rotation means for rotating said second beam diverting means about an axis which is substantially parallel to said first and second directions, thereby rotating said second part of said second portion of said primary beam to define a reference plane which is substantially perpendicular to said first and second stationary reference beams.

3. An apparatus for projecting a light beam as claimed in claim 2, wherein said first portion of said primary beam, said second portion of said primary beam and said axis are substantially collinear with one another.

4. An apparatus for projecting a light beam as claimed in claim 2, wherein said first and second portions of said primary beam are offset from one another and said axis is substantially collinear with said second portion of said primary beam.

5. An apparatus for projecting a light beam to provide a plurality of reference beams, comprising:

means for providing a primary light beam in an initial path;

first beam diverting means for intercepting said primary beam and diverting a first portion thereof into a first direction to emerge from said apparatus in said first direction as a first stationary reference beam and a second portion of said primary beam into a second direction substantially parallel to said first direction;

second beam diverting means for intercepting said second portion of said primary beam and permitting a first part of said second portion to pass therethrough and emerge from said apparatus as a second stationary reference beam and for diverting a second part of said second portion of said primary beam into a third direction which is substantially perpendicular to said first and second directions to define a reference plane which is substantially perpendicular to said first and second stationary reference beams; and wherein said first beam diverting means comprises a first prism having a first surface which is fully reflective for intercepting and diverting said primary beam from said initial path substantially 90 degrees into a fourth direction toward a second surface of said first prism, said second surface of said first prism being partially reflective and partially transmissive for diverting said second portion of said primary beam from said fourth direction substantially 90 degrees into said second direction and allowing said first portion and a third portion of said primary beam to exit from said first prism therethrough in said fourth direction, a second prism having a fully reflective surface for reflecting said first portion and said third portion of said primary beam into a fifth direction back toward said second surface of said first prism, said fifth direction being parallel and opposite to said fourth direction, and said second surface of said first prism further diverting said first portion of said primary beam reflected by said reflective surface of said second prism from said fifth direction substantially 90 degrees into said first direction to emerge from said apparatus as said first stationary reference beam while allowing said third portion of said primary beam to pass therethrough.

6. An apparatus for projecting a light beam as claimed in claim 5, further comprising rotation means for rotating said second beam diverting means about an axis which is substantially parallel to said first and second directions to generate said reference plane.

7. An apparatus for projecting a light beam as claimed in claim 6, wherein said second beam diverting means comprises:

a first mirror having a first reflection surface which is partially reflective and partially transmissive, said first mirror being positioned in the path of said second portion of said primary beam traveling in said second direction at an angle to reflect said second part of said second portion while permitting said first part of said second portion to pass therethrough as said second stationary reference beam; and a second mirror having a second reflection surface which is fully reflective, said second mirror being positioned in the path of said second part of said second portion of said primary beam reflected by said first mirror and is oriented with said reflection surface thereof at an angle of substantially 45 degrees with respect to said reflection surface of said first mirror for further reflecting said second part of said second portion of said primary beam into said third direction.

8. An apparatus for projecting a light beam as claimed in claim 7, wherein said second beam diverting means further comprises a correcting element which is substantially transmissive and which is positioned in the path of said second stationary reference beam to compensate for error in the second stationary reference beam position produced by said first mirror.

9. An apparatus for projecting a light beam as claimed in claim 6, wherein said first portion of said primary beam, said second portion of said primary beam and said axis are substantially collinear with one another.

10. An apparatus for projecting a light beam as claimed in claim 6, wherein said first and second portions of said primary beam are offset from one another and said axis is substantially collinear with said second portion of said primary beam.

* * * * *

UNITED STATES PATENT AND TRADEMARK OFFICE
CERTIFICATE OF CORRECTION

PATENT NO. : 5,144,486

DATED : September 1, 1992

INVENTOR(S) : Edward E. Hart

It is certified that error appears in the above-identified patent and that said Letters Patent is hereby corrected as shown below:

Column 10, line 27, "means or" should be --means for--.

Signed and Sealed this

Fifth Day of October, 1993

Attest:

BRUCE LEHMAN

Attesting Officer      Commissioner of Patents and Trademarks